US011226847B2

(12) United States Patent
Alluboyina et al.

(10) Patent No.: US 11,226,847 B2
(45) Date of Patent: Jan. 18, 2022

(54) IMPLEMENTING AN APPLICATION MANIFEST IN A NODE-SPECIFIC MANNER USING AN INTENT-BASED ORCHESTRATOR

(71) Applicant: Robin Systems, Inc., San Jose, CA (US)

(72) Inventors: Ravi Kumar Alluboyina, Santa Clara, CA (US); Tushar Doshi, Santa Clara, CA (US); Sree Nandan Atur, Newark, CA (US)

(73) Assignee: ROBIN SYSTEMS, INC., San Jose, CA (US)

( * ) Notice: Subject to any disclaimer, the term of this patent is extended or adjusted under 35 U.S.C. 154(b) by 172 days.

(21) Appl. No.: 16/555,886

(22) Filed: Aug. 29, 2019

(65) Prior Publication Data

US 2021/0064442 A1  Mar. 4, 2021

(51) Int. Cl.
*G06F 9/46* (2006.01)
*G06F 9/50* (2006.01)
*G06F 9/48* (2006.01)

(52) U.S. Cl.
CPC .......... *G06F 9/5083* (2013.01); *G06F 9/4881* (2013.01)

(58) Field of Classification Search
CPC .............................. G06F 9/5083; G06F 9/4881
See application file for complete search history.

(56) References Cited

U.S. PATENT DOCUMENTS

| 3,715,573 | A | 2/1973 | Vogelsberg |
| 4,310,883 | A | 1/1982 | Clifton |
| 5,602,993 | A | 2/1997 | Stromberg |
| 5,680,513 | A | 10/1997 | Hyland |
| 5,796,290 | A | 8/1998 | Takahashi |
| 6,014,669 | A | 1/2000 | Slaughter |

(Continued)

FOREIGN PATENT DOCUMENTS

WO    WO2017008675    1/2017

OTHER PUBLICATIONS

Segment map, Feb. 4, 2019.

(Continued)

*Primary Examiner* — Camquy Truong
(74) *Attorney, Agent, or Firm* — David R. Stevens; Stevens Law Group

(57) ABSTRACT

An orchestrator generated pod specifications for role instances of a bundled application and submits these pod specifications to a KUBERNETES master. The pod specification specifies a node on which to implement a container executing the role instance, the node being selected according to an application manifest that may include affinity and anti-affinity constraints. The pod specification may be implemented by a KUBELET executing on the node, which may invoke interfaces to the orchestrator in order to obtain a network address for the container. A storage volume to be used by the container may have been mounted to the node previously by the orchestrator and be ready for use by the container. Upon failure of the node, the orchestrator generates a new pod specification according to the application manifest that instructs the master to create a new container having a same identity and state as the former container.

18 Claims, 6 Drawing Sheets

(56) References Cited

U.S. PATENT DOCUMENTS

| | | |
|---|---|---|
| 6,052,797 A | 4/2000 | Ofek |
| 6,119,214 A | 9/2000 | Dirks |
| 6,157,963 A | 12/2000 | Courtright, II |
| 6,161,191 A | 12/2000 | Slaughter |
| 6,298,478 B1 | 10/2001 | Nally |
| 6,301,707 B1 | 10/2001 | Carroll |
| 6,311,193 B1 | 10/2001 | Sekido |
| 6,851,034 B2 | 2/2005 | Challenger |
| 6,886,160 B1 | 4/2005 | Lee |
| 6,895,485 B1 | 5/2005 | Dekoning |
| 6,957,221 B1 | 10/2005 | Hart |
| 7,096,465 B1 | 8/2006 | Dardinski |
| 7,111,055 B2 | 9/2006 | Falkner |
| 7,171,659 B2 | 1/2007 | Becker |
| 7,246,351 B2 | 7/2007 | Bloch |
| 7,305,671 B2 | 12/2007 | Davidov |
| 7,461,374 B1 | 12/2008 | Balint |
| 7,535,854 B2 | 5/2009 | Luo |
| 7,590,620 B1 | 9/2009 | Pike |
| 7,698,698 B2 | 4/2010 | Skan |
| 7,721,283 B2 | 5/2010 | Kovachka |
| 7,734,859 B2 | 6/2010 | Daniel |
| 7,738,457 B2 | 6/2010 | Nordmark |
| 7,779,091 B2 | 8/2010 | Wilkinson |
| 7,797,693 B1 | 9/2010 | Gustafson |
| 7,984,485 B1 | 7/2011 | Rao |
| 8,037,471 B2 | 10/2011 | Keller |
| 8,046,450 B1 | 10/2011 | Schloss |
| 8,060,522 B2 | 11/2011 | Birdwell |
| 8,121,874 B1 | 2/2012 | Guheen |
| 8,171,141 B1 | 5/2012 | Offer |
| 8,219,821 B2 | 7/2012 | Zimmels |
| 8,250,033 B1 | 8/2012 | De Souter |
| 8,261,295 B1 | 9/2012 | Risbood |
| 8,326,883 B2 | 12/2012 | Pizzorni |
| 8,392,498 B2 | 3/2013 | Berg |
| 8,429,346 B1 | 4/2013 | Chen |
| 8,464,241 B2 | 6/2013 | Hayton |
| 8,505,003 B2 | 8/2013 | Bowen |
| 8,527,544 B1 | 9/2013 | Colgrove |
| 8,601,467 B2 | 12/2013 | Hofhansl |
| 8,620,973 B1 | 12/2013 | Veeraswamy |
| 8,666,933 B2 | 3/2014 | Pizzorni |
| 8,745,003 B1 | 6/2014 | Patterson |
| 8,775,751 B1 | 7/2014 | Pendharkar |
| 8,782,632 B1 | 7/2014 | Chigurapati |
| 8,788,634 B2 | 7/2014 | Krig |
| 8,832,324 B1 | 9/2014 | Hodges |
| 8,886,806 B2 | 11/2014 | Tung |
| 8,909,885 B2 | 12/2014 | Corbett |
| 8,954,383 B1 | 2/2015 | Vempati |
| 8,954,568 B2 | 2/2015 | Krishnan |
| 8,966,198 B1 | 2/2015 | Harris |
| 9,134,992 B2 | 9/2015 | Wong |
| 9,146,769 B1 | 9/2015 | Shankar |
| 9,148,465 B2 | 9/2015 | Gambardella |
| 9,152,337 B2 | 10/2015 | Kono |
| 9,167,028 B1 | 10/2015 | Bansal |
| 9,280,591 B1 | 3/2016 | Kharatishvili |
| 9,330,155 B1 | 5/2016 | Bono |
| 9,336,060 B2 | 5/2016 | Nori |
| 9,342,444 B2 | 5/2016 | Minckler |
| 9,367,301 B1 | 6/2016 | Serrano |
| 9,390,128 B1 | 7/2016 | Seetala |
| 9,436,693 B1 | 9/2016 | Lockhart |
| 9,514,160 B2 | 12/2016 | Song |
| 9,521,198 B1 | 12/2016 | Agarwala |
| 9,569,274 B2 | 2/2017 | Tarta |
| 9,569,480 B2 | 2/2017 | Provencher |
| 9,600,193 B2 | 3/2017 | Ahrens |
| 9,613,119 B1 | 4/2017 | Aron |
| 9,619,389 B1 | 4/2017 | Roug |
| 9,635,132 B1 | 4/2017 | Lin |
| 9,667,470 B2 | 5/2017 | Prathipati |
| 9,747,096 B2 | 8/2017 | Searlee |
| 9,870,366 B1 | 1/2018 | Duan |
| 9,880,933 B1 | 1/2018 | Gupta |
| 9,892,265 B1 | 2/2018 | Tripathy |
| 9,929,916 B1 | 3/2018 | Subramanian |
| 9,998,955 B1 | 6/2018 | MacCarthaigh |
| 10,019,459 B1 | 7/2018 | Agarwala |
| 10,042,628 B2 | 8/2018 | Thompson |
| 10,061,520 B1 | 8/2018 | Zhao |
| 10,191,778 B1 | 1/2019 | Yang |
| 10,241,774 B2 | 3/2019 | Spivak |
| 10,282,229 B2 | 5/2019 | Wagner |
| 10,353,634 B1 | 7/2019 | Greenwood |
| 10,430,434 B2 | 10/2019 | Sun |
| 10,657,119 B1 | 5/2020 | Acheson |
| 10,956,246 B1 * | 3/2021 | Bagde ................ G06F 11/076 |
| 2002/0141390 A1 | 10/2002 | Fangman |
| 2004/0010716 A1 | 1/2004 | Childress |
| 2004/0153703 A1 | 8/2004 | Vigue |
| 2004/0221125 A1 | 11/2004 | Ananthanarayanan |
| 2005/0065986 A1 | 3/2005 | Bixby |
| 2005/0216895 A1 | 9/2005 | Tran |
| 2005/0256948 A1 | 11/2005 | Hu |
| 2006/0025908 A1 | 2/2006 | Rachlin |
| 2006/0053357 A1 | 3/2006 | Rajski |
| 2006/0085674 A1 | 4/2006 | Ananthamurthy |
| 2006/0259686 A1 | 11/2006 | Sonobe |
| 2007/0006015 A1 | 1/2007 | Rao |
| 2007/0016786 A1 | 1/2007 | Waltermann |
| 2007/0067583 A1 | 3/2007 | Zohar |
| 2007/0165625 A1 | 7/2007 | Eisner |
| 2007/0260842 A1 | 11/2007 | Faibish |
| 2007/0277056 A1 | 11/2007 | Varadarajan |
| 2007/0288791 A1 | 12/2007 | Allen |
| 2008/0010421 A1 | 1/2008 | Chen |
| 2008/0068899 A1 | 3/2008 | Ogihara |
| 2008/0189468 A1 | 8/2008 | Schmidt |
| 2008/0235544 A1 | 9/2008 | Lai |
| 2008/0256167 A1 * | 10/2008 | Branson ................ H04L 69/40 |
| | | 709/201 |
| 2008/0263400 A1 | 10/2008 | Waters |
| 2008/0270592 A1 | 10/2008 | Choudhary |
| 2009/0144497 A1 | 6/2009 | Withers |
| 2009/0172335 A1 | 7/2009 | Kulkarni |
| 2009/0240809 A1 | 9/2009 | La Frese |
| 2009/0254701 A1 | 10/2009 | Kurokawa |
| 2009/0307249 A1 | 12/2009 | Koifman |
| 2010/0100251 A1 | 4/2010 | Chao |
| 2010/0161941 A1 | 6/2010 | Vyshetsky |
| 2010/0162233 A1 | 6/2010 | Ku |
| 2010/0211815 A1 | 8/2010 | Mankovskii |
| 2010/0274984 A1 | 10/2010 | Inomata |
| 2010/0299309 A1 | 11/2010 | Maki |
| 2010/0306495 A1 | 12/2010 | Kumano |
| 2010/0332730 A1 | 12/2010 | Royer |
| 2011/0083126 A1 | 4/2011 | Bhakta |
| 2011/0119664 A1 | 5/2011 | Kimura |
| 2011/0188506 A1 | 8/2011 | Arribas |
| 2011/0208928 A1 | 8/2011 | Chandra |
| 2011/0246420 A1 | 10/2011 | Wang |
| 2011/0276951 A1 | 11/2011 | Jain |
| 2012/0005557 A1 | 1/2012 | Mardiks |
| 2012/0066449 A1 | 3/2012 | Colgrove |
| 2012/0102369 A1 | 4/2012 | Hiltunen |
| 2012/0216052 A1 | 8/2012 | Dunn |
| 2012/0226667 A1 | 9/2012 | Volvovski |
| 2012/0240012 A1 | 9/2012 | Weathers |
| 2012/0259819 A1 | 10/2012 | Patwardhan |
| 2012/0265976 A1 | 10/2012 | Spiers |
| 2012/0303348 A1 | 11/2012 | Lu |
| 2012/0311671 A1 | 12/2012 | Wood |
| 2012/0331113 A1 | 12/2012 | Jain |
| 2013/0054552 A1 | 2/2013 | Hawkins |
| 2013/0054932 A1 | 2/2013 | Acharya |
| 2013/0080723 A1 | 3/2013 | Sawa |
| 2013/0254521 A1 | 9/2013 | Bealkowski |
| 2013/0282662 A1 | 10/2013 | Kumarasamy |
| 2013/0332688 A1 | 12/2013 | Corbett |
| 2013/0339659 A1 | 12/2013 | Bybell |
| 2013/0346709 A1 | 12/2013 | Wang |

(56) References Cited

U.S. PATENT DOCUMENTS

| | | |
|---|---|---|
| 2014/0006465 A1 | 1/2014 | Davis |
| 2014/0047263 A1 | 2/2014 | Coatney |
| 2014/0047341 A1 | 2/2014 | Breternitz |
| 2014/0047342 A1 | 2/2014 | Breternitz |
| 2014/0058871 A1 | 2/2014 | Marr |
| 2014/0059527 A1 | 2/2014 | Gagliardi |
| 2014/0059528 A1 | 2/2014 | Gagliardi |
| 2014/0108483 A1 | 4/2014 | Tarta |
| 2014/0130040 A1 | 5/2014 | Lemanski |
| 2014/0195847 A1 | 7/2014 | Webman |
| 2014/0245319 A1 | 8/2014 | Fellows |
| 2014/0281449 A1 | 9/2014 | Christopher |
| 2014/0282596 A1 | 9/2014 | Bourbonnais |
| 2015/0046644 A1 | 2/2015 | Karp |
| 2015/0067031 A1 | 3/2015 | Acharya |
| 2015/0074358 A1 | 3/2015 | Flinsbaugh |
| 2015/0112951 A1 | 4/2015 | Narayanamurthy et al. |
| 2015/0134857 A1 | 5/2015 | Hahn |
| 2015/0149605 A1 | 5/2015 | de la Iglesia |
| 2015/0186217 A1 | 7/2015 | Eslami |
| 2015/0278333 A1 | 10/2015 | Hirose |
| 2015/0317212 A1 | 11/2015 | Lee |
| 2015/0326481 A1 | 11/2015 | Rector |
| 2015/0379287 A1 | 12/2015 | Mathur |
| 2016/0011816 A1 | 1/2016 | Aizman |
| 2016/0026667 A1* | 1/2016 | Mukherjee ............ G06F 16/278 707/714 |
| 2016/0042005 A1 | 2/2016 | Liu |
| 2016/0124775 A1 | 5/2016 | Ashtiani |
| 2016/0197995 A1 | 7/2016 | Lu |
| 2016/0239412 A1 | 8/2016 | Wada |
| 2016/0259597 A1 | 9/2016 | Worley |
| 2016/0283261 A1 | 9/2016 | Nakatsu |
| 2016/0357456 A1 | 12/2016 | Iwasaki |
| 2016/0357548 A1 | 12/2016 | Stanton |
| 2016/0373327 A1 | 12/2016 | Degioanni |
| 2017/0060710 A1 | 3/2017 | Ramani |
| 2017/0060975 A1 | 3/2017 | Akyureklier |
| 2017/0139645 A1 | 5/2017 | Byun |
| 2017/0149843 A1 | 5/2017 | Amulothu |
| 2017/0168903 A1 | 6/2017 | Dornemann |
| 2017/0192889 A1 | 7/2017 | Sato |
| 2017/0214550 A1 | 7/2017 | Kumar |
| 2017/0235649 A1 | 8/2017 | Shah |
| 2017/0242617 A1 | 8/2017 | Walsh |
| 2017/0242719 A1 | 8/2017 | Tsirkin |
| 2017/0244557 A1 | 8/2017 | Riel |
| 2017/0244787 A1 | 8/2017 | Rangasamy |
| 2017/0322954 A1 | 11/2017 | Horowitz |
| 2017/0337492 A1 | 11/2017 | Chen |
| 2017/0371551 A1 | 12/2017 | Sachdev |
| 2018/0006896 A1 | 1/2018 | Macnamara |
| 2018/0024889 A1 | 1/2018 | Verma |
| 2018/0046553 A1 | 2/2018 | Okamoto |
| 2018/0082053 A1 | 3/2018 | Brown |
| 2018/0107419 A1 | 4/2018 | Sachdev |
| 2018/0113625 A1 | 4/2018 | Sancheti |
| 2018/0113770 A1 | 4/2018 | Hasanov |
| 2018/0136931 A1 | 5/2018 | Hendrich |
| 2018/0137306 A1 | 5/2018 | Brady |
| 2018/0150306 A1 | 5/2018 | Govindaraju |
| 2018/0159745 A1 | 6/2018 | Byers |
| 2018/0165170 A1 | 6/2018 | Hegdal |
| 2018/0218000 A1 | 8/2018 | Setty |
| 2018/0225216 A1 | 8/2018 | Filippo |
| 2018/0246670 A1 | 8/2018 | Baptist |
| 2018/0246745 A1 | 8/2018 | Aronovich |
| 2018/0247064 A1 | 8/2018 | Aronovich |
| 2018/0276215 A1 | 9/2018 | Chiba |
| 2018/0285164 A1 | 10/2018 | Hu |
| 2018/0285223 A1 | 10/2018 | McBride |
| 2018/0285353 A1 | 10/2018 | Ramohalli |
| 2018/0287883 A1 | 10/2018 | Joshi |
| 2018/0302335 A1 | 10/2018 | Gao |
| 2018/0329981 A1 | 11/2018 | Gupte |
| 2018/0364917 A1 | 12/2018 | Ki |
| 2018/0375728 A1 | 12/2018 | Gangil |
| 2019/0065061 A1 | 2/2019 | Kim |
| 2019/0065323 A1 | 2/2019 | Dhamdhere |
| 2019/0073132 A1 | 3/2019 | Zhou |
| 2019/0073372 A1 | 3/2019 | Venkatesan |
| 2019/0079928 A1 | 3/2019 | Kumar |
| 2019/0089651 A1 | 3/2019 | Pignatari |
| 2019/0102226 A1 | 4/2019 | Caldato |
| 2019/0109756 A1 | 4/2019 | Abu Lebdeh |
| 2019/0116690 A1 | 4/2019 | Chen |
| 2019/0148932 A1 | 5/2019 | Benesch |
| 2019/0156023 A1 | 5/2019 | Gerebe |
| 2019/0163460 A1 | 5/2019 | Kludy |
| 2019/0188094 A1 | 6/2019 | Ramamoorthi |
| 2019/0190803 A1 | 6/2019 | Joshi |
| 2019/0199601 A1 | 6/2019 | Lynar |
| 2019/0213085 A1 | 7/2019 | Alluboyina |
| 2019/0215313 A1 | 7/2019 | Doshi |
| 2019/0220266 A1 | 7/2019 | Doshi |
| 2019/0220315 A1 | 7/2019 | Vallala |
| 2019/0235895 A1 | 8/2019 | Ovesea |
| 2019/0250849 A1 | 8/2019 | Compton |
| 2019/0272205 A1 | 9/2019 | Jiang |
| 2019/0278624 A1 | 9/2019 | Bade |
| 2019/0324666 A1 | 10/2019 | Kusters |
| 2019/0334727 A1 | 10/2019 | Kaufman |
| 2019/0369273 A1 | 12/2019 | Liu |
| 2020/0019414 A1 | 1/2020 | Byard |
| 2020/0034193 A1 | 1/2020 | Jayaram |
| 2020/0034254 A1 | 1/2020 | Natanzon |
| 2020/0083909 A1 | 3/2020 | Kusters |
| 2020/0150977 A1 | 5/2020 | Wang |
| 2020/0257519 A1 | 8/2020 | Shen |
| 2020/0356537 A1 | 11/2020 | Sun |
| 2021/0042151 A1 | 2/2021 | Muller |
| 2021/0067607 A1 | 3/2021 | Gardner |

OTHER PUBLICATIONS

Implementing time critical functionalities with a distributed adaptive container architecture, Stankovski, Nov. 2016.

Segment map, Google, Feb. 4, 2019.

Fast and Secure Append-Only storage with Infinite Capacity, Zheng, Aug. 27, 2003.

User Mode and Kernel Mode, Microsoft, Apr. 19, 2017.

Precise memory leak detection for java software using container profiling, Xu, Jul. 2013.

Mogi et al., "Dynamic Parity Stripe Reorganizations for RAID5 Disk Arrays," 1994, IEEE, pp. 17-26.

Syed et al., "The Container Manager Pattern", ACM, pp. 1-9 (Year 2017).

Rehmann et al., "Performance of Containerized Database Management Systems", ACM, pp. 1-6 (Year 2018).

Awada et al., "Improving Resource Efficiency of Container-instance Clusters on Clouds", IEEE, pp. 929-934 (Year 2017).

Stankovski et al, "Implementing Time-Critical Functionalities with a Distributed Adaptive Container Architecture", ACM, pp. 1-5 (Year 2016).

Dhakate et al, "Distributed Cloud Monitoring Using Docker as Next Generation Container Virtualization Technology" IEEE, pp. 1-5 (Year 2015).

Crameri et al, "Staged Deployment in Mirage, an Integrated Software Upgrade Testing and Distribution System", ACM, pp. 221-236 (Year: 2007).

Cosmo et al, "Packages Upgrades in FOSS Distributions: Details and Challenges", AC 2008).

Burg et al, "Atomic Upgrading of Distributed Systems", ACM, pp. 1-5 (Year: 2008).

Souer et al, "Component Based Architecture forWeb Content Management: Runtime Deployable Web Manager Component Bundles", IEEE, pp. 366-369 (Year: 2008).

(56) References Cited

OTHER PUBLICATIONS

Weingartner et al, "A distributed autonomic management framework for cloud computing orchestration." In 2016 IEEE World Congress on Services (Year: 2016).

* cited by examiner

IMPLEMENTING AN APPLICATION MANIFEST IN A NODE-SPECIFIC MANNER USING AN INTENT-BASED ORCHESTRATOR

BACKGROUND

Field of the Invention

This invention relates to orchestration of roles in an application instantiated in a distributed storage and computation system.

Background of the Invention

Many computing tasks are complex and require many different application instances to be running and cooperating with one another. The installation and management of such an application is a complex task. One tool for performing such a task is KUBERNETES, which can both instantiate containers executing application instances, scale the number of application instances based on load, and replaced failed application instances.

The systems and methods disclosed herein provide an improved approach for using KUBERNETES to deploy and manage a multi-role application.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

Figure 1:
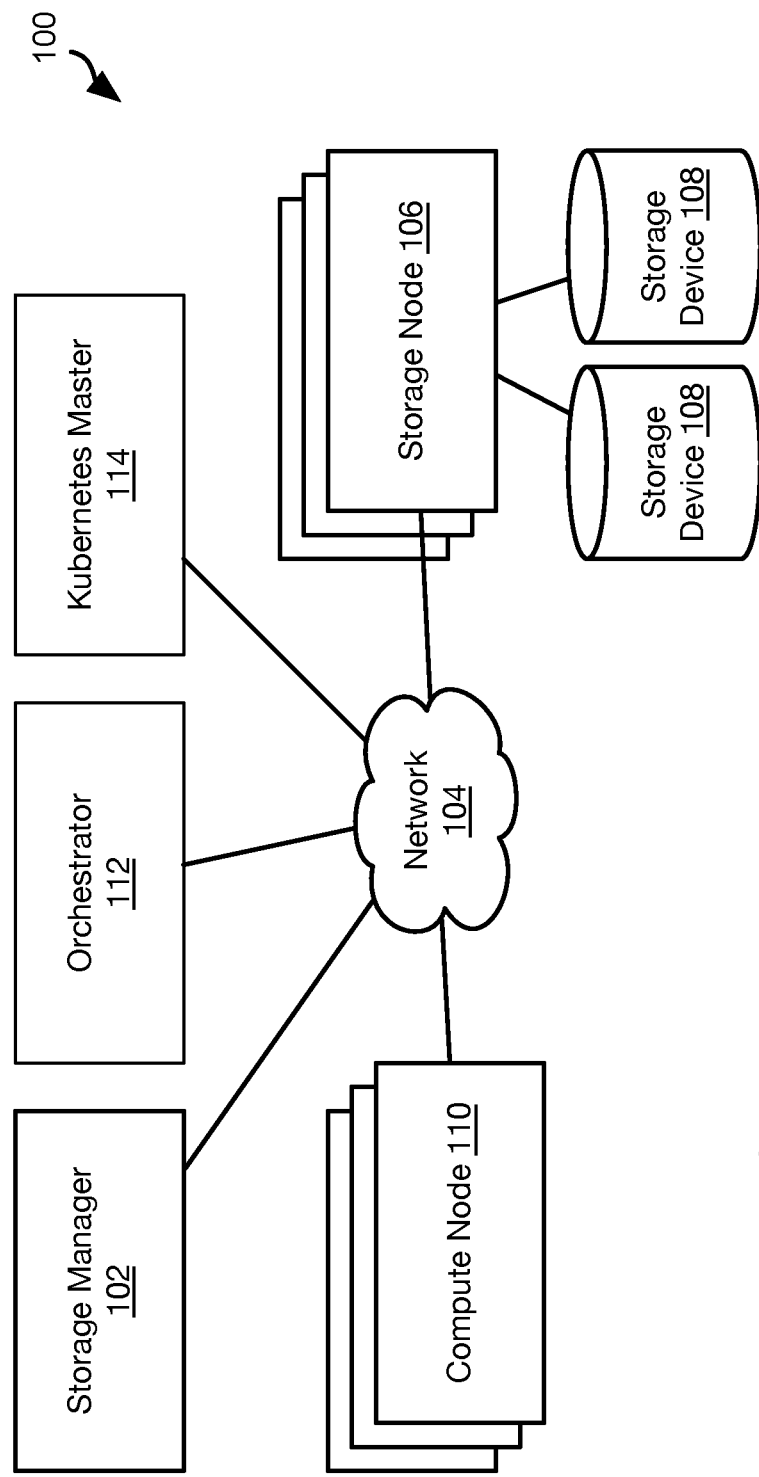
FIG. 1 is a schematic block diagram of a computing environment in which the methods disclosed herein may be implemented in accordance with an embodiment of the present invention.

Referring to FIG. 1, the methods disclosed herein may be performed using the illustrated network environment 100. The network environment 100 includes a storage manager 102 that coordinates the creation of storage volumes and maintains records of where storage volumes are stored within the network environment 100. In particular, the storage manager 102 may be connected by way of a network 104 to one or more storage nodes 106, each storage node having one or more storage devices 108, e.g. hard disk drives, flash memory, or other persistent or transitory memory. The network 104 may be a local area network (LAN), wide area network (WAN), or any other type of network including wired, fireless, fiber optic, or any other type of network connections.

One or more compute nodes 110 are also coupled to the network 104 and host user applications that generate read and write requests with respect to storage volumes managed by the storage manager 102 and stored within the memory devices 108 of the storage nodes 106.

In some embodiments, an orchestrator 112 may execute on a computer system of the network environment 100 and facilitate deployment of a multi-role application on the compute nodes 110. The orchestrator 112 may further instruct the storage manager 102 regarding the creation of storage volumes on the storage nodes 106 and the mounting of such storage volumes to particular compute nodes 110.

The orchestrator 112 may perform this function in cooperation with a KUBERNETES (hereinafter "Kubernetes") master 114. In particular, the Kubernetes master 114 may manage the deployment of containers on compute nodes 110, monitor availability of the containers, and restore containers on compute nodes 110 upon failure of the container or the compute node 110 executing it.

The methods disclosed herein ascribe certain functions to the storage manager 102, storage nodes 106, compute node 110, orchestrator 112, and Kubernetes master 114. The methods disclosed herein are particularly useful for large scale deployment including large amounts of data distributed over many storage nodes 106 and accessed by many compute nodes 110. However, the methods disclosed herein may also be implemented using a single computer implementing the functions ascribed herein to some or all of the storage manager 102, storage nodes 106, and compute node 110.

Figure 2:
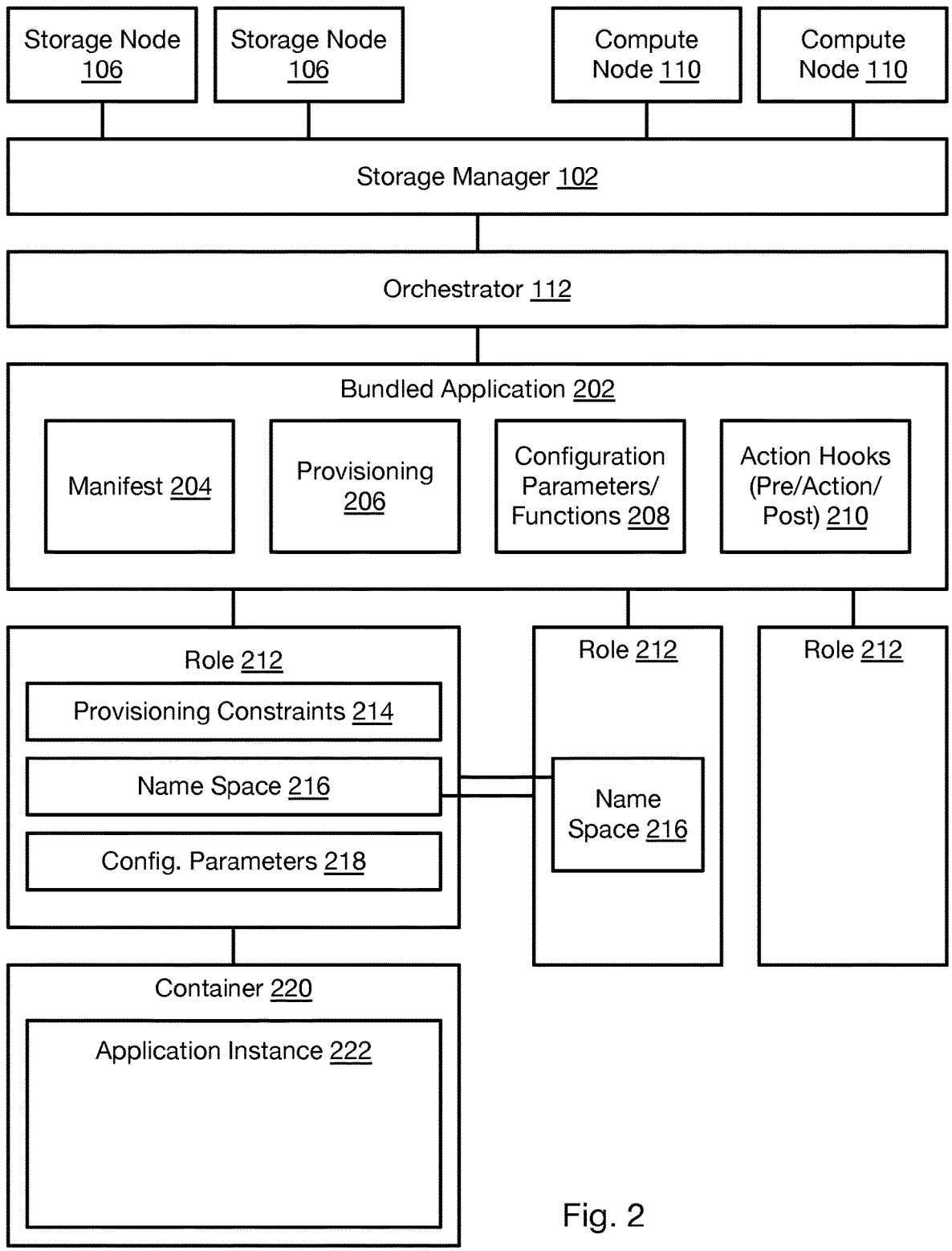
FIG. 2 is a schematic block diagram of data structures for implementing a bundled application in accordance with an embodiment of the present invention.

Referring to FIG. 2, storage according to the above-described methods and systems may be incorporated into an application-orchestration approach. In the illustrated approach, an orchestrator 112 implements a bundled application 202 including a plurality of roles. In the following description, "bundled application" refers to a bundle of applications as implemented using the orchestrator 112. A "role instance" is an instance of an executable that is managed by the orchestrator 112 as described herein as part of the bundled application. Accordingly, a "role instance" may itself be a standalone application, such as a database, webserver, blogging application, or any other application. Examples of roles include CASSANDRA, HADOOP, SPARK, DRUID, SQL database, ORACLE database, MONGODB database, WORDPRESS, and the like.

The orchestrator 112 may implement a bundled application 202 defining roles and relationships between roles as described in greater detail below. The bundled application 202 may include a manifest 204 that defines the roles of the bundled application 202, which may include identifiers of role instances, network addresses to be assigned to role instances, and possibly a number of instances for each role instance may be identified. The manifest 204 may define dynamic functions defining how the number of instances of particular role may grow or shrink depending on usage. The orchestrator 112 may then create or remove instances for a role as described below as indicated by usage and one or more functions for that role. The manifest 204 may define a topology of the bundled application 202, i.e. the relationship between roles, such as services of a role that are accessed by another role.

The bundled application 202 may include provisioning 206. The provisioning 206 defines the resources of storage nodes 106 and compute nodes 110 required to implement the bundle. The provisioning 206 may define resources for the bundle as a whole or for individual roles. Resources may include a number of processors (e.g., processing cores), an amount of memory (e.g., RAM (random access memory), an amount of storage (e.g., GB (gigabytes) on a HDD (Hard Disk Drive) or SSD (Solid State Drive)). These resources may be provisioned in a virtualized manner such that the bundled application 202 and individual roles 212 are not informed of the actual location or processing and storage resources and are relieved from any responsibility for managing such resources. In particular, storage resources may be virtualized by the storage manager 102 using the methods described above such that storage volumes are allocated and used without requiring the bundled application 202 or roles to manage the underlying storage nodes 106 and storage device 108 on which the data of the storage volumes is written.

Provisioning 206 may include static specification of resources and may also include dynamic provisioning functions that will invoke allocation of resources in response to usage of the bundled application. For example, as a database fills up, additional storage volumes may be allocated. As usage of a bundled application increases, additional processing cores and memory may be allocated to reduce latency.

A bundled application 202 may further include configuration parameters 208. Configuration parameters may include variables and settings for each role of the bundle. The configuration parameters are defined by the developer of the role and therefore may include any example of such parameters for any application known in the art. The configuration parameters may be dynamic or static. For example, some parameters may be dependent on resources such as an amount of memory, processing cores, or storage. Accordingly, these parameters may be defined as a function of these resources. The orchestrator 112 will then update such parameters according to the function in response to changes in provisioning of those resources that are inputs to the function. For example, CASSANDRA defines a variable Max_Heap_Size that is normally set to half the memory limit. Accordingly, as the memory provisioned for a CASSANDRA role increases, the value of Max_Heap_Size may be increased to half the increased memory.

The bundled application 202 may further include action hooks 210 for various actions that may be taken with respect to the bundled application and/or particular roles of the bundled applications. Actions may include some or all of stopping, starting, restarting, taking snapshots, cloning, and rolling back to a prior snapshot. For each action, one or more action hooks may be defined. A hook is a programmable routine that is executed by the orchestrator 112 when the corresponding action is invoked. A hook may specify a script of commands or configuration parameters input to one or more roles in a particular order. Hooks for an action may include a pre-action hook (executed prior to implementing an action), an action hook (executed to actually implement the action), and a post action hook (executed following implementation of the action).

The bundled application 202 may define a plurality of roles 212. Each role may include one or more provisioning constraints. As noted above, the bundled application 202 and roles 212 are not aware of the underlying storage nodes 106 and compute nodes 110 inasmuch as these are virtualized by the storage manager 102 and orchestrator 112. Accordingly, any constraints on allocation of hardware resources may be included in the provisioning constraints 214. As described in greater detail below, this may include constraints to create separate fault domains in order to implement redundancy and constraints on latency.

The role 212 may define a name space 216. A name space 216 may include variables, functions, services, and the like implemented by a role. In particular, interfaces and services exposed by a role may be included in the name space. The name space may be referenced through the orchestrator 112 by an addressing scheme, e.g. <Bundle ID>.<Role ID>.<Name>. In some embodiments, references to the name space 216 of another role may be formatted and processed according to the JINJA template engine or some other syntax. Accordingly, each role 212 may access the variables, functions, services, etc. in the name space 216 of another role 212 on order to implement a complex application topology. In some instances, credentials for authorizing access to a role 212 may be shared by accessing the namespace 216 of that role.

A role 212 may further include various configuration parameters 218 defined by the role, i.e. as defined by the developer that created the executable for the role. As noted above, these parameters 218 may be set by the orchestrator 112 according to the static or dynamic configuration parameters 208. Configuration parameters may also be referenced in the name space 216 and be accessible (for reading and/or writing) by other roles 212.

Each role 212 may include a container 220 executing an instance 222 of the application for that role. The container 220 may be a virtualization container, such as a virtual machine, that defines a context within which the application instance 222 executes, facilitating starting, stopping, restarting, and other management of the execution of the application instance 222. Containers 220 may include any container technology known in the art such as DOCKER, LXC, LCS, KVM, or the like. In a particular bundled application 202, there may be containers 220 of multiple different types in order to take advantage of a particular container's capabilities to execute a particular role 212. For example, one role 212 of a bundled application 202 may execute a DOCKER container 220 and another role 212 of the same bundled application 202 may execute an LCS container 220. The manifest 204 and/or provisioning 206 may define a particular container 220 of the bundled application 220 to mount each provisioned storage volume for use by that container 220.

Note that a bundled application 202 as configured in the foregoing description may be instantiated and used or may be saved as a template that can be used and modified later.

The operation of the orchestrator 112 and storage manager 102 with respect to the bundled application 202 may be performed according to the approaches described in the applications of Table 1 that are hereby incorporated herein by reference in their entirety ("the incorporated applications"):

TABLE 1

| Applications Incorporated by Reference | | |
|---|---|---|
| Title | Filing Date | Ser. No. |
| Storage Scheme for a Distributed Storage System | Sep. 13, 2017 | 15/703,719 |
| Storage Scheme for a Distributed Storage System | Sep. 13, 2017 | 15/703,790 |
| Storage Scheme for a Distributed Storage System | Sep. 13, 2017 | 15/703,803 |
| Window-Based Priority Tagging Of Iops In A Distributed Storage System | Nov. 8, 2017 | 15/806,769 |
| Allocating Storage Requirements In A Distributed Storage System | Nov. 8, 2017 | 15/807,035 |
| Managing QOS Priorities In Primary And Replica Storage Nodes Of A Distributed Storage System | Nov. 8, 2017 | 15/806,795 |
| Creating Snapshots Of A Storage Volume In A Distributed Storage System | Sep. 5, 2017 | 15/695,818 |
| Creating Snapshots Of A Storage Volume In A Distributed Storage System | Sep. 5, 2017 | 15/695,886 |
| Implementing A Hybrid Storage Node In A Distributed Storage System | Dec. 19, 2017 | 15/847,652 |
| Snapshot Deletion In A Distributed Storage System | Dec. 19, 2017 | 15/847,693 |
| Encoding Tags For Metadata Entries In A Storage System | Dec. 19, 2017 | 15/847,739 |
| Storage Scheme For A Distributed Storage System | Sep. 19, 2017 | 15/709,269 |
| Storage Scheme For A Distributed Storage System | Sep. 19, 2017 | 15/709,296 |
| Multi-Role Application Orchestration In A Distributed Storage System | Jan. 11, 2018 | 15/868,613 |
| Implementing Fault Domain And Latency Requirements In A Virtualized Distributed Storage System | Jan. 11, 2018 | 15/868,652 |
| Implementing Clone Snapshots In A Distributed Storage System | Jan. 11, 2018 | 15/868,682 |
| Implementing Containers For A Stateful Application In A Distributed Computing System | Jan. 11, 2018 | 15/868,725 |
| Accessing Log Files In A Distributed Computing System | Jan. 11, 2018 | 15/868,771 |
| Implementing An Interface To A High-Availability Storage System In A Distributed Computing System | Jan. 11, 2018 | 15/868,818 |
| Upgrading Bundled Applications In A Distributed Computing System | Jan. 12, 2018 | 15/870,321 |
| Implementing Secure Communication In A Distributed Computing System | Jan. 11, 2018 | 15/868,586 |
| Monitoring Containers In A Distributed Computing System | Jan. 12, 2018 | 15/870,296 |
| Automated Management Of Bundled Applications | Oct. 22, 2018 | 16/167,049 |
| Automated Management Of Bundled Applications | Oct. 22, 2018 | 16/167,109 |
| Dynamic Adjustment Of Application Resources In A Distributed Computing System | Jan. 12, 2018 | 15/870,466 |
| Fenced Clone Applications | Jan. 11, 2018 | 15/868,686 |
| Implementing Application Entrypoints With Containers of a Bundled Application | Jan. 11, 2018 | 15/868,740 |
| Job Manager For Deploying A Bundled Application | Jan. 12, 2018 | 15/870,083 |
| Implementing Affinity And Anti-Affinity Constraints In A Bundled Application | Jul. 31, 2018 | 16/050,655 |
| Block Map Cache | Jul. 30, 2018 | 16/049,073 |
| Redo Log For Append Only Storage Scheme | Jul. 30, 2018 | 16/049,279 |
| Implementing Storage Volumes Over Multiple Tiers | Jul. 31, 2018 | 16/050,801 |
| Relocation Of A Primary Copy Of A Replicated Volume | Jul. 30, 2018 | 16/049,416 |
| Storage Scheme for a Distributed Storage System | Sep. 13, 2017 | 15/703,719 |
| Storage Scheme for a Distributed Storage System | Sep. 13, 2017 | 15/703,790 |
| Storage Scheme for a Distributed Storage System | Sep. 13, 2017 | 15/703,803 |
| Window-Based Priority Tagging Of Iops In A Distributed Storage System | Nov. 8, 2017 | 15/806,769 |

TABLE 1-continued

Applications Incorporated by Reference

| Title | Filing Date | Ser. No. |
| --- | --- | --- |
| Allocating Storage Requirements In A Distributed Storage System | Nov. 8, 2017 | 15/807,035 |
| Managing QOS Priorities In Primary And Replica Storage Nodes Of A Distributed Storage System | Nov. 8, 2017 | 15/806,795 |
| Creating Snapshots Of A Storage Volume In A Distributed Storage System | Sep. 5, 2017 | 15/695,818 |
| Creating Snapshots Of A Storage Volume In A Distributed Storage System | Sep. 5, 2017 | 15/695,886 |
| Implementing A Hybrid Storage Node In A Distributed Storage System | Dec. 19, 2017 | 15/847,652 |
| Snapshot Deletion In A Distributed Storage System | Dec. 19, 2017 | 15/847,693 |
| Encoding Tags For Metadata Entries In A Storage System | Dec. 19, 2017 | 15/847,739 |
| Storage Scheme For A Distributed Storage System | Sep. 19, 2017 | 15/709,269 |
| Storage Scheme For A Distributed Storage System | Sep. 19, 2017 | 15/709,296 |
| Multi-Role Application Orchestration In A Distributed Storage System | Jan. 11, 2018 | 15/868,613 |
| Implementing Fault Domain And Latency Requirements In A Virtualized Distributed Storage System | Jan. 11, 2018 | 15/868,652 |
| Implementing Clone Snapshots In A Distributed Storage System | Jan. 11, 2018 | 15/868,682 |
| Implementing Containers For A Stateful Application In A Distributed Computing System | Jan. 11, 2018 | 15/868,725 |
| Accessing Log Files In A Distributed Computing System | Jan. 11, 2018 | 15/868,771 |
| Implementing An Interface To A High-Availability Storage System In A Distributed Computing System | Jan. 11, 2018 | 15/868,818 |
| Upgrading Bundled Applications In A Distributed Computing System | Jan. 12, 2018 | 15/870,321 |
| Implementing Secure Communication In A Distributed Computing System | Jan. 11, 2018 | 15/868,586 |
| Monitoring Containers In A Distributed Computing System | Jan. 12, 2018 | 15/870,296 |
| Automated Management Of Bundled Applications | Oct. 22, 2018 | 16/167,049 |
| Automated Management Of Bundled Applications | Oct. 22, 2018 | 16/167,109 |
| Dynamic Adjustment Of Application Resources In A Distributed Computing System | Jan. 12, 2018 | 15/870,466 |
| Fenced Clone Applications | Jan. 11, 2018 | 15/868,686 |
| Implementing Application Entrypoints With Containers of a Bundled Application | Jan. 11, 2018 | 15/868,740 |
| Job Manager For Deploying A Bundled Application | Jan. 12, 2018 | 15/870,083 |
| Implementing Affinity And Anti-Affinity Constraints In A Bundled Application | Jul. 31, 2018 | 16/050,655 |
| Block Map Cache | Jul. 30, 2018 | 16/049,073 |
| Redo Log For Append Only Storage Scheme | Jul. 30, 2018 | 16/049,279 |
| Implementing Storage Volumes Over Multiple Tiers | Jul. 31, 2018 | 16/050,801 |
| Relocation Of A Primary Copy Of A Replicated Volume | Jul. 30, 2018 | 16/049,416 |
| Storage Scheme For A Distributed Storage System | Nov. 15, 2018 | 16/192,471 |
| Snapshot Reservations In A Distributed Storage System | May 2, 2019 | 16/402,086 |
| Data De-Duplication | Apr. 17, 2019 | 16/387,400 |
| Orchestration of Heterogeneous Multi-Role Applications | Mar. 25, 2019 | 16/363,907 |
| Changing A Distributed Storage Volume From Non-Replicated To Replicated | May 15, 2019 | 16/413,295 |

Figure 3:
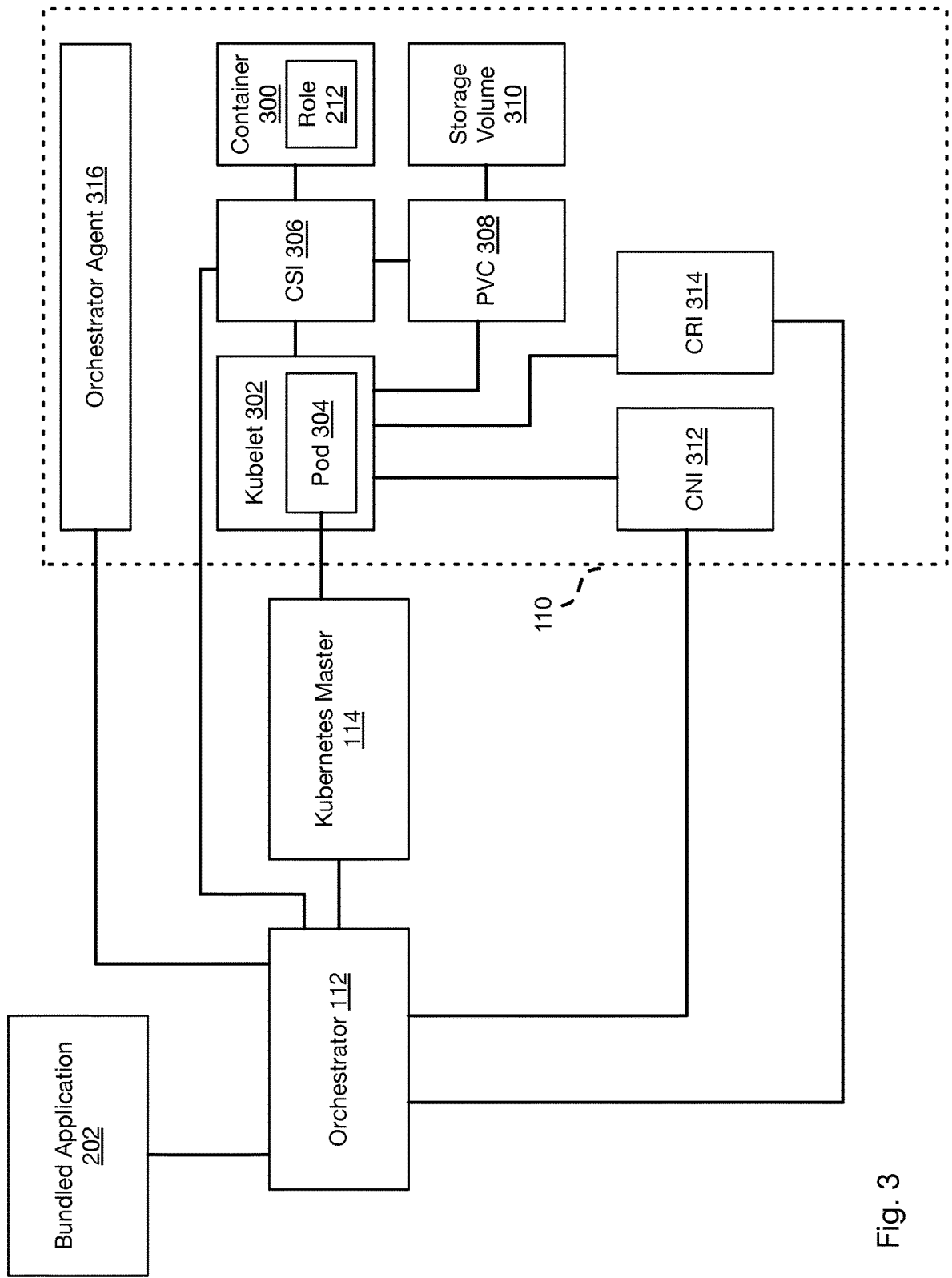
FIG. 3 is a schematic block diagram illustrating components for instantiating containers on a compute node using an orchestrator and Kubernetes master in accordance with an embodiment of the present invention.

FIG. 3 illustrates the cooperation between the orchestrator 112 and the Kubernetes master 114 to implement a container executing a roll instance 212. In particular, the orchestrator 112 ingests the bundled application 202, particularly the manifest 204 and provisioning 206. The orchestrator 112 generates pod specifications defining containers to be created and managed by the Kubernetes master 114. The manner in which the pod specifications are generated may be as described below with respect to FIG. 4. The Kubernetes master 114 receives the pod specifications and invokes their implementation on a compute node 110. Note that a compute node 110 as described in the methods below may also be a hybrid node that is a compute node 110 that also operates as a storage node 106.

The Kubernetes master 114 may provide the pod specification to a Kubelet 302 executing on the compute node 110 and may also invoke instantiation of the Kubelet on the compute node 110 if not already present. The Kubelet 302 then instantiates a pod 304 that may instantiate and manage one or more containers 300 according to the pod specification. The Kubelet 302 may monitor the state of operation of the containers 300 and report their status to the Kubernetes master 114.

As known in the art, a Kubernetes installation include the Kubernetes master 114 that is programmed to receive instructions in the form of a helm chart, StatefulSet, or operators received from a user or script. Accordingly, the Kubernetes master 114 is a second orchestrator in addition to the orchestrator 112 that operates in a different manner and in a different scope than the orchestrator 112.

For example, instructions to the Kubernetes master 114 may instruct it to allocate a Kubernetes node, which is a computer or virtual (e.g., cloud) computing resource that is allocated for providing a service. The Kubernetes master 114 may select an available node 110 and invoke installation of the Kubelet 302 on that node 110, which is an agent that implements instructions from the master 114 as well as reports the status of components executing on the node. A node 110 may execute one or more pods 304, which is a group of one or more containers 300 with shared resources, such as storage resources, network resources, or the like. The pod 304 may further define a virtual machine in which all containers of the pod 304 execute. The pod 304 may define a common name space that is accessible by all of the containers of the pod.

The Kubernetes master 114 is an "intent-based" orchestrator and implements containers and pods based on available resources according to instructions. The Kubernetes master 114 does not implement constraints on the nodes on which pods and containers are instantiated. The Kubernetes master 114 maintains availability of containers by instantiating new instances of a container when another instance fails. However, the Kubernetes master 114 does so without maintaining the state of the failed container, including not maintaining the identity or network address of the failed container.

The orchestrator 112 may take advantage of the services of the Kubernetes master 114 while overcoming its deficiencies according to the methods disclosed herein. In particular, a Kubelet 302 may configure the pod 304 to execute one or more executables that function as agents or interfaces for performing tasks involved in the instantiation and configuration of a container 300. These executables may be programmed to interact with the orchestrator 112 in order to provide orchestration in accordance with the bundled application 202 that would not otherwise be possible within the functionality provided by the Kubernetes master 114 on its own.

These executables may include a container storage interface (CSI) 306 that manages persistent volume claims (PVCs) 308 that define an interface to a storage volume 310, such as a logical storage volume implemented by the storage manager 102 and as described in the incorporated applications.

A container network interface (CNI) 312 is an executable that manages the acquiring of a network address for a container and otherwise manages establishing and maintaining a network connection between the container 300 and other computers on a network 104.

A container runtime interface (CRI) 314 is an executable that configures, stores, or retrieves a runtime state of the container 300 and is called by the Kubelet 302 upon instantiation of the container 300 in order to obtain data defining its state of execution.

As shown in FIG. 3, the orchestrator 112 may be referenced by some or all of the CSI 306, CNI 312, and CRI 314. Accordingly, these interfaces may interact with the orchestrator 112 in order to perform their functions in accordance with the manifest 204 of the bundled application 202. The manner in which this may performed is described below with respect to FIGS. 4 and 5.

In some embodiments, a compute node 110 may further execute an orchestrator agent 316. The orchestrator agent 316 communicates with the orchestrator 112 and informs the orchestrator information such as an operating state of the containers 300 and roles 212 executing on the compute node 110 and may further monitor and report on the state of operation of the compute node 110 itself. The orchestrator 112 may therefore detect failure of the compute node 110 based on report of such a failure by the orchestrator agent 316 or in response to failing to receive a report from the orchestrator agent 316 within a timeout period from a time of receipt of a previous report.

Figure 4:
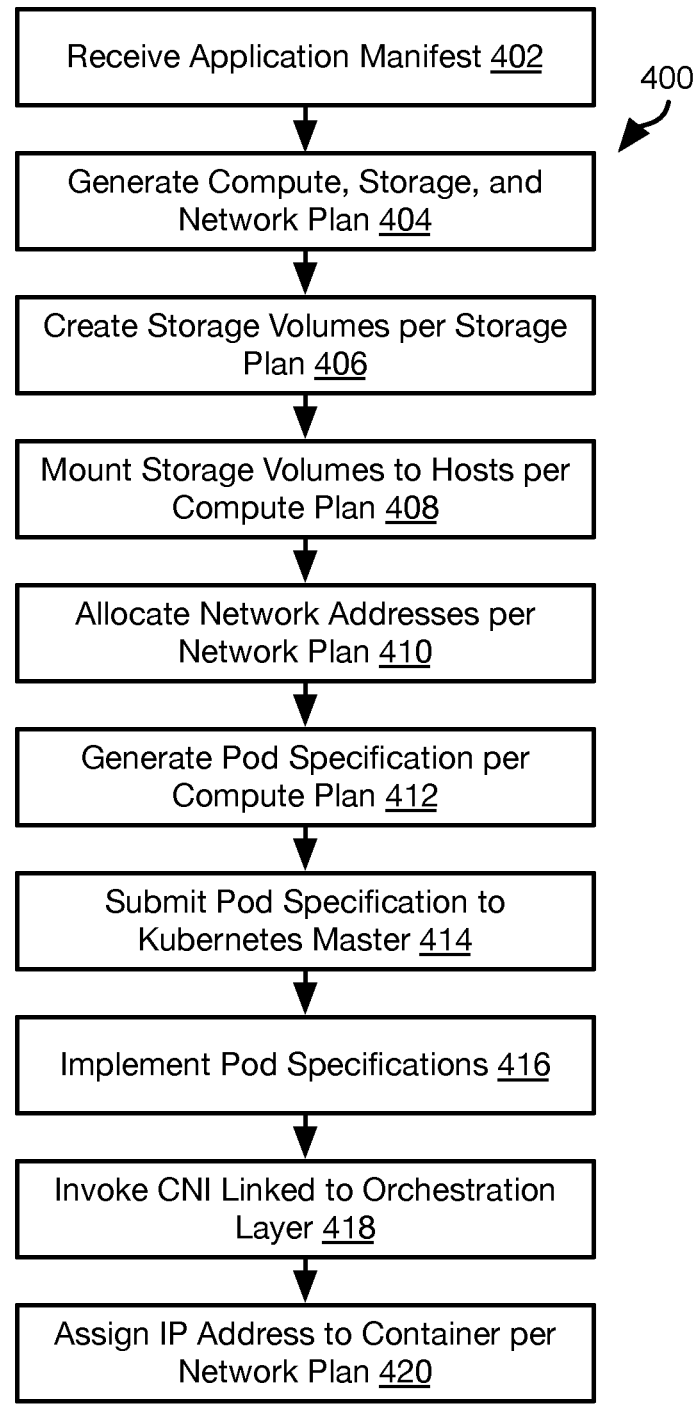
FIG. 4 is a process flow diagram of a method for instantiating containers on a compute node using an orchestrator and Kubernetes master in accordance with an embodiment of the present invention.

Referring to FIG. 4, the illustrated method 400 may be executed by the orchestrator 112 in cooperation with the Kubernetes master 114 and Kubelets 302 on compute nodes 110 of the computing environment 100.

The method 400 may include the orchestrator 112 receiving 402 the application manifest 204 of a bundled application 202 and generating 404 plans for implementing the computation, storage, and networking for implementing the application manifest 204.

In particular, the computation plan may include identifying compute nodes 110 (which may be hybrid nodes) for hosting containers executing role instances 212 defined by the application manifest 204. The storage plan identifies the storage nodes 106 for hosting storage volumes defined by the application manifest 204. The networking plan defines network addresses to be assigned to containers executing role instances 212 as defined by the application manifest 204.

Generating the plans may be performed with respect to a listing of an available resources. The listing may identify available compute nodes 110 and storage nodes 106, including their storage and performance capacity and location (network domain, server rack, data center, city, etc.). The listing may be compiled by or programmed into a resource manager native to the orchestrator 112 or by means of an API (application programming interface) implemented by the Kubernetes master 114. The listing may be compiled manually or using any network discovery technique known in the art.

Generating 404 the plans may include taking into account anti-affinity constraints in the application manifest 204 that specify that a particular role instance 212 should not be on the same node, in the same network domain, the same data center, or within some other level of affinity with another role instance 212 or storage device 108 hosting a storage volume. For example, where one role instance 212 is a backup for another role instance 212, these may be constrained to be on different nodes or have some other level of anti-affinity to help ensure availability of at least one of them.

Generating the computation plan may include taking into account affinity constraints that specify that a particular role instance 212 should be on the same node, in the same network domain, the same data center, or within some other level of affinity with another role instance 212 or storage device 108 hosting a storage volume. Generating 404 the computation plan and storage plan may be performed according to the approaches of ROBN-01801 and ROBN-02700 referenced in Table 1, above.

The result of step 404 is a mapping between each role instance 212 (such as role instance identifier of the each role instance) specified in the application manifest 204 and a node 110 selected to host that role instance. The result of step 404 may further include a mapping between each storage volume (such as an identifier of the each storage volume) specified in the application manifest 204 and a storage node 106 selected to implement that storage volume. Likewise, the result of step 404 may be listing of network identifiers for each container implementing a role instance 212. The network identifiers may be specified explicitly in the application manifest 204 for each role instance 212 or may be selected based on the subnet masks of domains of the nodes on which the role instances 212 are to be instantiated.

The method 400 may then include creating 406 storage volumes according to the storage plan. This may include implementing any of the approaches described in the incorporated applications for creating a storage volume. In particular, step 406 may include allocating one or more storage devices 108 of a storage node 106 to a storage volume mapped in the storage plan to that storage node 106. This may include configuring the storage node 106 to implement the storage volume and reserve some storage capacity for the storage volume or to allocate portions of a storage device 108 to the storage volume and write data to it in response to write requests addressed to that storage volume as described in the incorporated applications.

The method 400 may include mounting 408 these storage volumes on the compute nodes 110 that will host containers using the storage volumes according to the application manifest 204 and the compute plan of step 404. This may include mounting the storage volumes to the file system of the compute nodes 110 or otherwise making the storage volumes available to be written to and read from on the compute nodes 110.

The method 400 may further include allocating 410 network addresses according to the network plan. In particular, the network plan specifies that particular containers are to be assigned particular network addresses. Accordingly, the orchestrator 112 may acquire these network addresses in the network domains to which they belong, such as according to the domain name service (DNS) protocol. In some embodiments, for a given container, the node 110 that is mapped to that container in the computation plan will be instructed to acquire the IP address for the role instance to be executed by that container.

The method 400 may further include the orchestrator 112 generating 412 pod specifications for the containers of the role instances 212 specified in the application manifest 204. In particular, the pod specification may specify such information as an identifier (e.g., IP address) of the specific compute node 110 on which a container is to be instantiated and a reference to an executable file (e.g., application binary file or files) to be instantiated as the role instance 212. The pod specification may also indicate a type of container to be instantiated, e.g. DOCKER, LXC, LCS, KVM, or the like. The pod specification may further reference a storage volume mounted to the specific compute node 110 as mounted at step 408. The pod specification may further include an identifier of the container as specified in the application manifest 204 or determined according to he compute plan at step 404.

Note that the Kubernetes master 114 is capable of and programmed to select a node and instantiate a container and application instance on it from a set of available nodes. However, the pod specification suppresses this functionality by limiting the set of available nodes to a single node selected at step 404 for the role instance 212 to be installed on that node.

The pod specifications from step 412 may then be submitted 414 to the Kubernetes master 114, which then attempts to implement 416 the pod specifications. Step 414 may include the orchestrator 112 placing jobs in queue of Kubernetes master, each job including one of the pod specifications from step 412.

In particular, for each pod specification, the Kubernetes invokes a Kubelet 302 on the compute node 110 referenced by the pod specification to create a container as specified in the pod specification: install an instance of the container type in the pod specification and load an instance of the role instance 212 referenced by the pod specification. In some embodiments, the pod specification may further reference executables to be used by the Kubelet for the CSI 306, PVC 308, CNI 312, and CRI 314. Accordingly, implementing 416 the pod specification may include invoking some or all of the CSI 306, CNI 312, and CRI 314.

In some embodiments, the CSI 306 performs no substantive functionality, i.e. it is present and executes in order to avoid interfering with the function of the Kubelet 302 but does not actually mount any storage volumes. This may be done in view of the fact that the storage volumes to be used by the container are already mounted to the node 110 referenced by the pod specification (step 408) and that mounted storage volume is described in the pod specification. The container instance on the node 110 may then be configured by the Kubelet 302 to reference the mounted storage volume without additional actions performed by the CSI 306.

The Kubelet 302 may further invoke 418 execution of the CNI 312. The CNI 312 communicates with the orchestrator 112 to obtain the network address assigned to the role instance 212 of the pod specification according to the network plan of step 404. The CNI 312 then performs actions to assign 420 that network address to the compute node 110 on which the container was instantiated according to the pod specification at step 416 and to the container.

Following performing steps 416-420 for the pod specifications generated at step 412, the bundled application 202 is instantiated comprising the containers hosting the role instances implemented at step 416. Note that instantiating the containers and initiating execution may include executing hooks as described in the incorporated applications.

Figure 5:
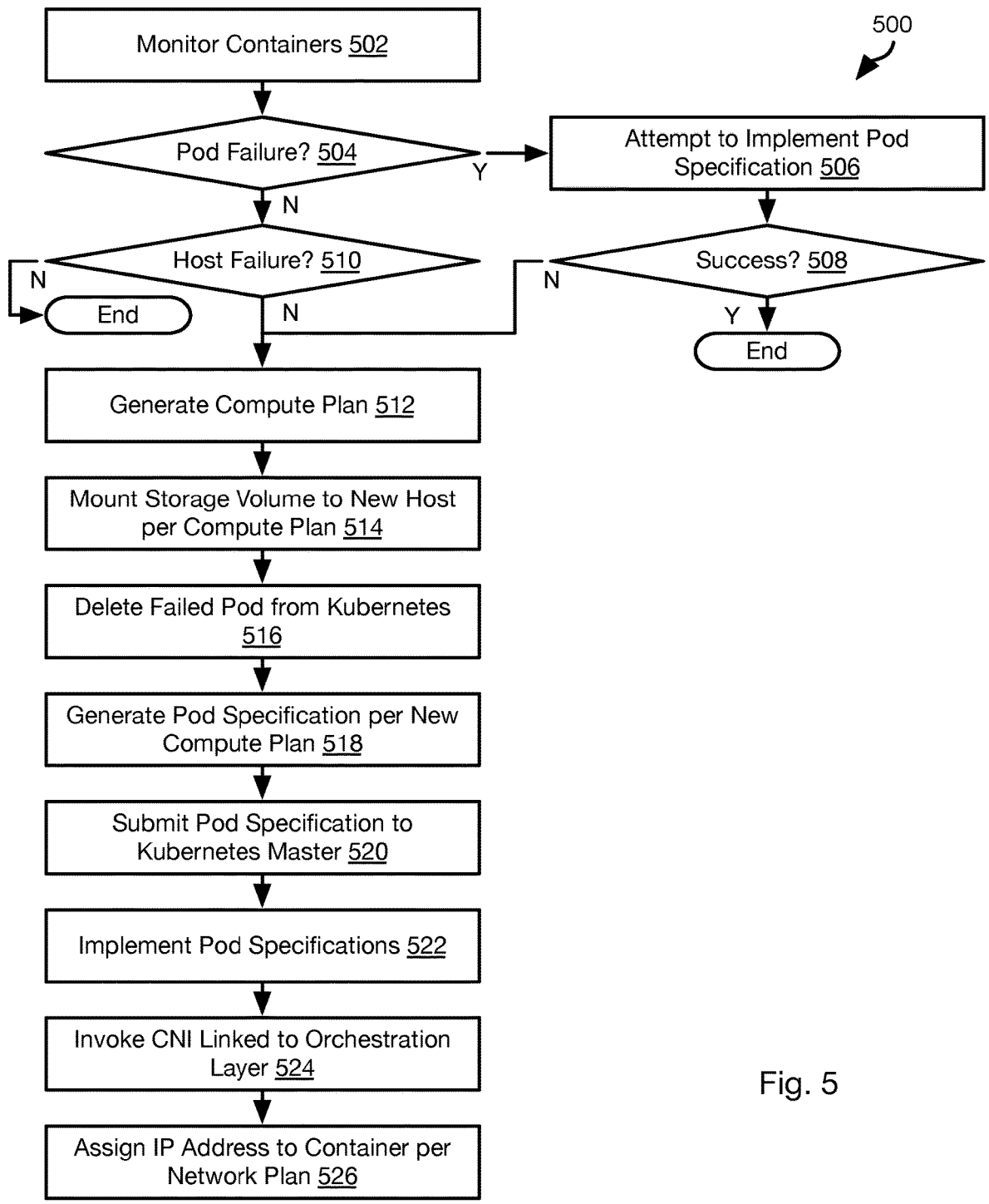
FIG. 5 is a process flow diagram of a method for recovering from failure of a node hosting a container in accordance with an embodiment of the present invention.

FIG. 5 illustrates a method 500 that may be executed in order to maintain availability of a container and role instance 212 instantiated according to the method 400. The method 500 may include monitoring 502 the containers and role instances 212 instantiated according to the method 500. Monitoring 502 may be performed by the Kubelet 402 and the Kubernetes master 114. For example, the Kubelet 402 may report the status of pods it is managing to the Kubernetes master 114 and the Kubernetes master 114 may monitor whether a timeout period passes without receiving a report from a Kubelet 402. The orchestrator 112 may interface with the master 114 to receive information regarding the status of the containers and role instances 212. Monitoring 502 may also be performed by the orchestrator agents 316 executing on the nodes 110 executing the containers.

The method 500 may include detecting 504 failure of a pod on a node 110 during the monitoring of step 502. Failure of a pod may include failure of a container managed by the pod or the pod itself. In response, the Kubernetes master 114 may attempt 506 to implement the pod specification from the method 400 that invoked creation of the pod. For example, this may include implementing steps 416-420 as described above with respect to the pod specification. If the attempt of step 506 is found 508 to be successful, new instances of one or more containers according to the pod specification will be instantiated on the same node 110 specified in the pod specification and this container will have the identifier and network address of the failed container and be executing the role instance 212 specified in the pod specification.

If this is not found 508 to be successful or if a node 110 hosting a pod is found 510 to have failed, then some or all of steps 512-524 may be executed. Detecting failure of the node 110 itself may be reported by the Kubernetes master 114 to the orchestrator 112 in response to failing to receive reports from the Kubelet 302 on the node 110 within a timeout period or the orchestrator 112 failing to receive a report from the orchestrator agent 316 executing on the node 110 within a timeout period. Note that the Kubernetes master 114 is capable of invoking creation of a replacement pod in response to failure of a node hosting a pod. However, inasmuch as the pod specification submitted to the Kubernetes master 114 specifies a single node for a pod, this functionality is suppressed since no other node will satisfy the constraint of the pod specification.

In response to detecting failure of the node 110, the orchestrator 112 may generate 512 a compute plan for the role instances 212 that were executing within containers on the failed node 110. This may be performed as described above with respect to step 404 of the method 400 and may include identifying compute nodes 110 with capacity to host the role instances 212 and satisfying any affinity or anti-affinity constraints. Note that where the failed node 110 was also the storage node 106 for a storage volume used by the container executing on it, step 512 may include identifying a new storage node 106 with sufficient storage capacity in the storage devices 108 thereof to implement the storage volume.

In the case that the affinity constraints require the container and storage volume to be on the same node, step 512 may include identifying a node 110 that also include storage devices 108 with sufficient storage capacity to implement the storage volume. Step 512 differs from the approach of the method 400 inasmuch as many of the compute nodes 110 and storage nodes 106 may already be allocated to other containers or storage volumes. Accordingly, step 512 may include identifying those nodes 110, 106 with available capacity and selecting those that meet affinity and anti-affinity constraints for the one or more role instances 212 of the failed node 110.

The method 500 may further include mounting 514 a storage volume to the new node 110 selected for the failed pod according to the compute plan of step 512. This may be performed as described above with respect to step 410 of the method 400. Where the storage volume was not implemented by the failed node 110, the same storage volume that was mounted at step 408 for the failed pod may be mounted to the new node 110 at step 514. Where the failed node 110 also implemented the storage volume, a new storage volume may be created on the new node 110 or a different storage node 106 selected according to affinity and anti-affinity constraints.

The method 500 may include deleting 516 the failed pod from the Kubernetes installation, such as by the orchestrator 112 instructing the Kubernetes to delete the pod specification that was used to implement the pod on the failed node 110.

The method 500 may then include generating 518 a new pod specification and submitting 520 the new pod specification to the Kubernetes master 114. For example, the pod specification may be identical to that which was submitted to the failed node 110 to invoke creation of the pod on the failed node 110 at step 414 except that the node 110 referenced by the pod specification is changed to be the new node 110 selected according to the compute plan of step 512. Likewise, the new pod specification may specify a mounting point for a storage volume on the new node, which may be the same or different from the original pod specification.

The Kubernetes master 114 may then invoke implementing 522 of the pod specification on the new node. This may include invoking 524 the CNI 312, which coordinates with the orchestrator 112 to assign 526 an IP address to the container created according to the pod specification as described above with respect to steps 418 and 420 of the method 400.

In the case of a pod specification to replace a pod executing on a failed node 110, step 522 may include the Kubelet on the new node 110 invoking the CRI 314. The CRI 314 will coordinate with the orchestrator 112 to restore a state of execution of the container on the failed node 110. Note that the CRI 314 may be invoked by the Kubelet 302 upon instantiation of the original container to load an initial state of the original container in the same manner, such as according to a specification in the application manifest 204.

In particular, a root directory of the container on the failed node 110 may be configured to be a storage volume hosted by a different node, such as a storage node 106. Changes to the state of the container prior on the failed node 110 prior to failure may then be written to the storage volume by the container. Accordingly, when the new node 110 is selected and a new container is instantiated thereon at step 522, the CRI 314 may be communicate with the orchestrator 112, which instructs the CRI 314 to use the state stored on the storage volume to configure the initial state of the new container. The manner in which a container may be configured to maintain its state in a remote storage volume may be performed as described in ROBN-01900 (see listing of incorporated applications in Table 1). Examples of the state of operation of a container that may be stored on the storage volume and used to set the state of the new container may include such things as configuration settings saved on root disk, which may be a remote storage volume used and configured in the manner described in ROBN-01900. For an apache http server, configuration settings could be settings in /var/www/httpd.conf. For mysql, configuration settings could be those typically stored in /var/lib/mysql.conf. For Cassandra, configuration settings could be those typically stored in /etc/cassandra/cassandra.yaml.

Figure 6:
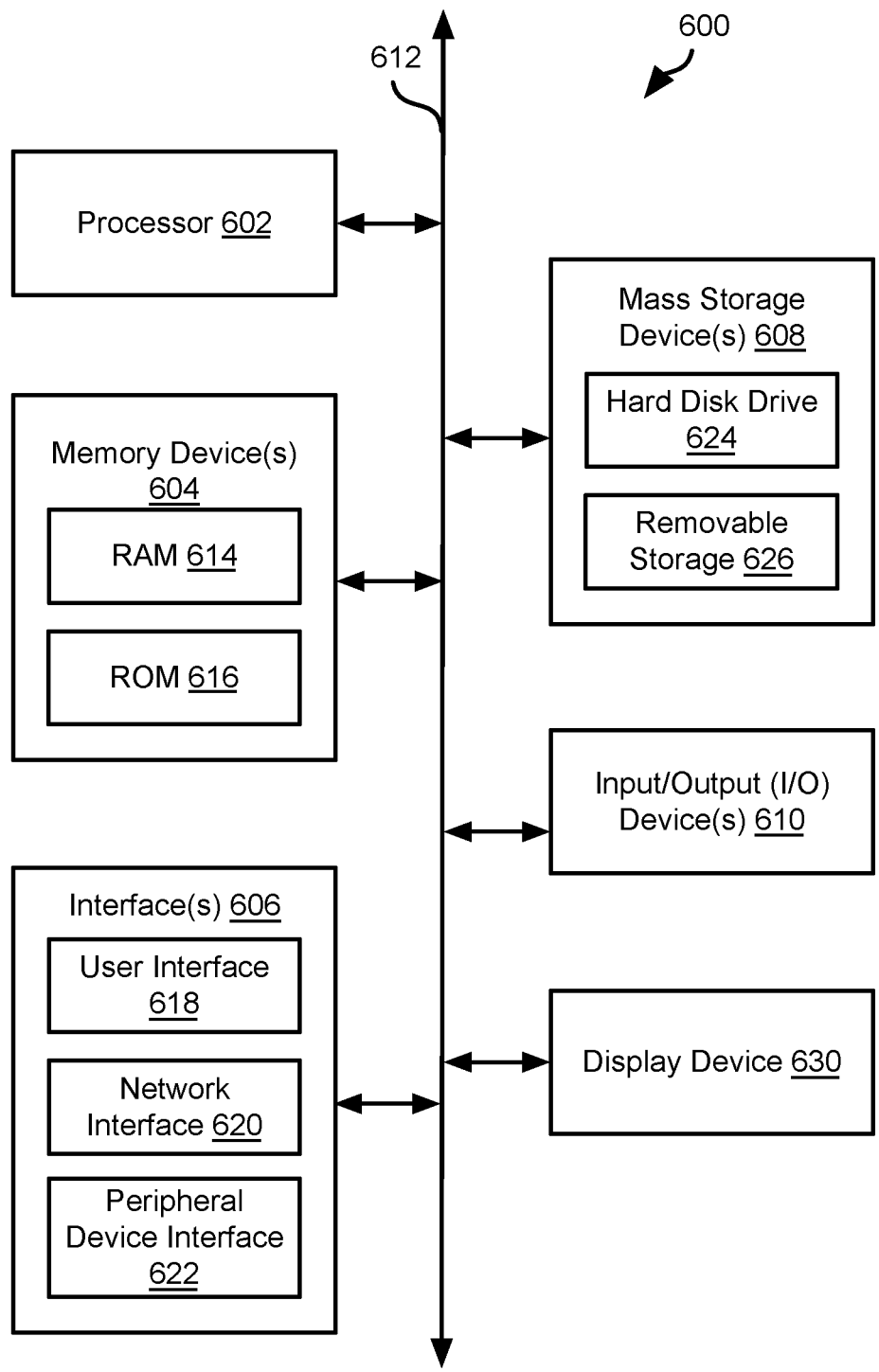
FIG. 6 is a schematic block diagram of an example computing device suitable for implementing methods in accordance with embodiments of the invention.

FIG. 6 is a block diagram illustrating an example computing device 600. Computing device 600 may be used to perform various procedures, such as those discussed herein. The storage manager 102, storage nodes 106, compute nodes 110, and hybrid nodes, or any computing device referenced herein may have some or all of the attributes of the computing device 600. The orchestrator 112 and Kubernetes master 114 may execute on one or more computing devices such as shown in FIG. 6.

Computing device 600 includes one or more processor(s) 602, one or more memory device(s) 604, one or more interface(s) 606, one or more mass storage device(s) 608, one or more Input/output (I/O) device(s) 610, and a display device 630 all of which are coupled to a bus 612. Processor(s) 602 include one or more processors or controllers that execute instructions stored in memory device(s) 604 and/or mass storage device(s) 608. Processor(s) 602 may also include various types of computer-readable media, such as cache memory.

Memory device(s) 604 include various computer-readable media, such as volatile memory (e.g., random access memory (RAM) 614) and/or nonvolatile memory (e.g., read-only memory (ROM) 616). Memory device(s) 604 may also include rewritable ROM, such as Flash memory.

Mass storage device(s) 608 include various computer readable media, such as magnetic tapes, magnetic disks, optical disks, solid-state memory (e.g., Flash memory), and so forth. As shown in FIG. 6, a particular mass storage device is a hard disk drive 624. Various drives may also be included in mass storage device(s) 608 to enable reading from and/or writing to the various computer readable media. Mass storage device(s) 608 include removable media 626 and/or non-removable media.

I/O device(s) 610 include various devices that allow data and/or other information to be input to or retrieved from computing device 600. Example I/O device(s) 610 include cursor control devices, keyboards, keypads, microphones, monitors or other display devices, speakers, printers, network interface cards, modems, lenses, CCDs or other image capture devices, and the like.

Display device 630 includes any type of device capable of displaying information to one or more users of computing device 600. Examples of display device 630 include a monitor, display terminal, video projection device, and the like.

Interface(s) 606 include various interfaces that allow computing device 600 to interact with other systems, devices, or computing environments. Example interface(s) 606 include any number of different network interfaces 620, such as interfaces to local area networks (LANs), wide area networks (WANs), wireless networks, and the Internet. Other interface(s) include user interface 618 and peripheral device interface 622. The interface(s) 606 may also include one or more peripheral interfaces such as interfaces for printers, pointing devices (mice, track pad, etc.), keyboards, and the like.

Bus 612 allows processor(s) 602, memory device(s) 604, interface(s) 606, mass storage device(s) 608, I/O device(s) 610, and display device 630 to communicate with one another, as well as other devices or components coupled to bus 612. Bus 612 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 600, and are executed by processor(s) 602. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

In the above disclosure, reference has been made to the accompanying drawings, which form a part hereof, and in which is shown by way of illustration specific implementations in which the disclosure may be practiced. It is understood that other implementations may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Implementations of the systems, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, an in-dash vehicle computer, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors, and may include hardware logic/electrical circuitry controlled by the computer code. These example devices are provided herein purposes of illustration, and are not intended to be limiting. Embodiments of the present disclosure may be implemented in further types of devices, as would be known to persons skilled in the relevant art(s).

At least some embodiments of the disclosure have been directed to computer program products comprising such logic (e.g., in the form of software) stored on any computer useable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments, but should be defined only in accordance with the following claims and their equivalents. The foregoing description has been presented for the purposes of illustration and description. It is not intended to be exhaustive or to limit the disclosure to the precise form disclosed. Many modifications and variations are possible in light of the above teaching. Further, it should be noted that any or all of the aforementioned alternate implementations may be used in any combination desired to form additional hybrid implementations of the disclosure.

The invention claimed is:

1. A method comprising:
providing a first orchestrator executing in a network computing environment including a plurality of computing nodes, the first orchestrator programmed to deploy a plurality of role instances of a bundled application on the plurality of computing nodes according to an application manifest;
providing a second orchestrator executing in the network computing environment, the second orchestrator programmed with a capacity to select among nodes of the plurality of computing nodes and instantiate containers and maintain availability of containers on the selected nodes; and
for each role instance of the plurality of role instances:
selecting, by the first orchestrator, for the each role instance, a host node for the each role instance;
invoking, by the first orchestrator, the second orchestrator to instantiate a container on the host node executing the each role instance such that the capacity of the second orchestrator to select among the plurality of computing nodes is suppressed;
instantiating, by the second orchestrator, the each role instance and a container executing the each role instance on the host node;
generating, by the first orchestrator, a network plan associating network identifiers with each role instance of the plurality of role instances; and
for each role instance of the plurality of role instances:
invoking, by the second orchestrator, an interface to the first orchestrator;
providing, by the first orchestrator to the second orchestrator, a selected network identifier of the network identifiers associated with the each role instance in the network plan; and
assigning, by the second orchestrator, the selected network identifier to the each role instance.

2. A method comprising:
providing a first orchestrator executing in a network computing environment including a plurality of computing nodes, the first orchestrator programmed to deploy a plurality of role instances of a bundled application on the plurality of computing nodes according to an application manifest;
providing a second orchestrator executing in the network computing environment, the second orchestrator programmed with a capacity to select among nodes of the plurality of computing nodes and instantiate containers and maintain availability of containers on the selected nodes; and for each role instance of the plurality of role instances:
  selecting, by the first orchestrator, for the each role instance, a host node for the each role instance;
  invoking, by the first orchestrator, the second orchestrator to instantiate a container on the host node executing the each role instance such that the capacity of the second orchestrator to select among the plurality of computing nodes is suppressed;
  instantiating, by the second orchestrator, the each role instance and a container executing the each role instance on the host node; and for each role instance of the plurality of role instances:
  invoking, by the first orchestrator, mounting of a storage volume to the host node for the each role instance prior to invoking the second orchestrator to instantiate the container on the host node executing the each role instance; and
  configuring, by the second orchestrator, the container on the host node to access the storage volume.

3. The method of claim 1, further comprising:
generating, by the first orchestrator, a compute plan specifying host nodes for all role instances of the plurality of role instances.

4. The method of claim 3, wherein generating the compute plan comprises assigning host nodes for all role instances of the plurality of role instances in accordance with affinity and anti-affinity constraints in the application manifest.

5. The method of claim 4, further comprising:
detecting, by the first orchestrator, failure of a first node of the plurality of computing nodes hosting a first container executing a first role instance of the plurality of role instances; and
in response to detecting the failure of the first node:
  identifying, by the first orchestrator, a second node of the plurality of computing nodes satisfying the affinity and anti-affinity constraints; and
  invoking, by the first orchestrator, the second orchestrator to instantiate the first role instance in a second container on the second node.

6. The method of claim 5, further comprising: instructing, by the first orchestrator, the second orchestrator to assign a same identifier to the second container as was assigned to the first container.

7. The method of claim 5, wherein detecting failure of the first node comprises:
detecting, by the first orchestrator, that an attempt by the second orchestrator to re-instantiate the first role instance on the first node was unsuccessful.

8. The method of claim 5, further comprising:
writing, by the first container, changes to a state of the first container to a persistent remote storage volume;
invoking, by the second container, an interface to the first orchestrator; and
instructing the second container, by the first orchestrator, through the interface, to configure its state according to the persistent remote storage volume.

9. The method of claim 1, wherein the second orchestrator comprises a KUBERNETES master and KUBELETs executing on the plurality of computing nodes.

10. A system comprising:
a network computing environment including a plurality of computing nodes;
a first orchestrator executing in the network computing environment, the first orchestrator programmed to deploy a plurality of role instances of a bundled application on the plurality of computing nodes according to an application manifest; and
a second orchestrator executing in the network computing environment, the second orchestrator programmed with a capacity to select among nodes of the plurality of computing nodes and instantiate containers and maintain availability of containers on the selected nodes;
wherein the first orchestrator and the second orchestrator are programmed to, for each role instance of the plurality of role instances:
  select, by the first orchestrator, for the each role instance, a host node for the each role instance;
  invoke, by the first orchestrator, the second orchestrator to instantiate a container on the host node executing the each role instance such that the capacity of the second orchestrator to select among the plurality of computing nodes is suppressed; and
  instantiate, by the second orchestrator, the each role instance and a container executing the each role instance on the host node; and
wherein the first orchestrator and the second orchestrator are programmed to:
for each role instance of the plurality of role instances:
  invoke, by the first orchestrator, mounting of a storage volume to the host node for the each role instance prior to invoking the second orchestrator to instantiate the container on the host node executing the each role instance; and
  configure, by the second orchestrator, the container on the host node to access the storage volume.

11. A system comprising:
a network computing environment including a plurality of computing nodes;
a first orchestrator executing in the network computing environment, the first orchestrator programmed to deploy a plurality of role instances of a bundled application on the plurality of computing nodes according to an application manifest; and
a second orchestrator executing in the network computing environment, the second orchestrator programmed to select nodes of the plurality of computing nodes and instantiate containers and maintain availability of containers on the selected nodes;
wherein the first orchestrator and the second orchestrator are programmed to, for each role instance of the plurality of role instances:
  select, by the first orchestrator, for the each role instance, a host node for the each role instance;
  invoke, by the first orchestrator, the second orchestrator to instantiate a container on the host node executing the each role instance such that the capacity of the second orchestrator to select among the plurality of computing nodes is suppressed; and
instantiate, by the second orchestrator, the each role instance and a container executing the each role instance on the host node; and
wherein the first orchestrator and the second orchestrator are programmed to:
generate, by the first orchestrator, a network plan associating network identifiers with each role instance of the plurality of role instances; and
for each role instance of the plurality of role instances:
  invoke, by the second orchestrator, an interface to the first orchestrator;

provide, by the first orchestrator to the second orchestrator, a selected network identifier of the network identifiers associated with the each role instance in the network plan; and assign, by the second orchestrator, the selected network identifier to the each role instance.

12. The system of claim 10, wherein the first orchestrator is further programmed to generate a compute plan specifying host nodes for all role instances of the plurality of role instances.

13. The system of claim 12, herein the first orchestrator is further programmed to generate the compute plan by assigning host nodes for all role instances of the plurality of role instances in accordance with affinity and anti-affinity constraints in the application manifest.

14. The system of claim 13, wherein the first orchestrator and the second orchestrator are programmed to:

detect, by the first orchestrator, failure of a first node of the plurality of computing nodes hosting a first container executing a first role instance of the plurality of role instances; and in response to detecting the failure of the first node:
identify, by the first orchestrator, a second node of the plurality of computing nodes satisfying the affinity and anti-affinity constraints; and invoke, by the first orchestrator, the second orchestrator to instantiate the first role instance in a second container on the second node.

15. The system of claim 14, wherein the first orchestrator is further programmed to instruct the second orchestrator to assign a same identifier to the second container as was assigned to the first container.

16. The system of claim 14, wherein the first orchestrator is programmed to detect failure of the first node by:
detecting that an attempt by the second orchestrator to re-instantiate the first role instance on the first node was unsuccessful.

17. The system of claim 14, wherein:
the first container is programmed to write changes to a state of the first container to a persistent remote storage volume;
the second container is programmed to invoke an interface to the first orchestrator; and
the first orchestrator is programmed to instruct the second container, through the interface, to configure its state according to the persistent remote storage volume.

18. The system of claim 10, wherein the second orchestrator comprises a KUBERNETES master and KUBELETs executing on the plurality of computing nodes.

* * * * *